US008780846B2

(12) United States Patent
Nanri et al.

(10) Patent No.: US 8,780,846 B2
(45) Date of Patent: Jul. 15, 2014

(54) COMPACT BASE STATION APPARATUS AND FRAME TIMING DIFFERENCE INFORMATION ACQUIRING METHOD

(75) Inventors: Masahiko Nanri, Kanagawa (JP); Jifeng Li, Kanagawa (JP); Yoshiharu Ohsaki, Kanagawa (JP); Ichirou Inaba, Kanagawa (JP)

(73) Assignee: Panasonic Corporation, Osaka (JP)

( * ) Notice: Subject to any disclaimer, the term of this patent is extended or adjusted under 35 U.S.C. 154(b) by 49 days.

(21) Appl. No.: 13/582,350

(22) PCT Filed: Feb. 15, 2011

(86) PCT No.: PCT/JP2011/000832
§ 371 (c)(1),
(2), (4) Date: Aug. 31, 2012

(87) PCT Pub. No.: WO2011/108202
PCT Pub. Date: Sep. 9, 2011

(65) Prior Publication Data
US 2013/0003716 A1 Jan. 3, 2013

(30) Foreign Application Priority Data
Mar. 3, 2010 (JP) ................................. 2010-046634

(51) Int. Cl.
H04W 4/00 (2009.01)
H04W 16/32 (2009.01)
(52) U.S. Cl.
CPC .................................. *H04W 16/32* (2013.01)
USPC ........................................ 370/329; 455/449
(58) Field of Classification Search
CPC ..... H04W 16/00; H04W 16/18; H04W 16/24; H04W 16/32; H04W 84/045; H04J 2211/001
USPC ................. 370/254, 310, 315, 328, 329, 338; 455/422.1, 446, 448, 449
See application file for complete search history.

(56) References Cited

U.S. PATENT DOCUMENTS

| 2009/0092122 | A1* | 4/2009 | Czaja et al. | .................... 370/350 |
| 2010/0120438 | A1* | 5/2010 | Kone et al. | ..................... 455/444 |
| 2011/0244792 | A1* | 10/2011 | Park et al. | ......................... 455/39 |
| 2011/0294493 | A1* | 12/2011 | Nagaraja et al. | ........... 455/422.1 |
| 2012/0015649 | A1* | 1/2012 | Li et al. | .......................... 455/434 |

OTHER PUBLICATIONS

International Search Report Dated May 17, 2011.
3GPP TSG-RAN WG4 Meeting#53, "HeNB Interference Coordination: An Alternative to X2," R4-094633, Nov. 8-14, 2009, pp. 1-7.
3GPP TSG RAN WG4 Meeting #52, "Reducing HeNB interference to Macro eNB control channels," R4-093091, Aug. 24-28, 2009, pp. 1-2.

* cited by examiner

Primary Examiner — Kerri Rose
(74) Attorney, Agent, or Firm — Dickinson Wright PLLC

(57) ABSTRACT

Provided is a compact base station apparatus (HeNB) whereby frame timing can precisely be synchronized between HeNB and MeNB, thereby suppressing the interference in an upstream channel. In HeNB (100), which forms a cell smaller than a cell formed by MeNB, frame timing detecting unit (111) detects, based on a sync signal received from MeNB, the frame timing of MeNB; a control unit (116) uses the frame timing of MeNB to set the frame timing of a downstream channel in HeNB (100); a transmission RF unit (118) transmits, in accordance with the frame timing of the downstream channel in HeNB (100), a preamble to MeNB; and a TA command extracting unit (114) acquires, from a response signal responsive to the preamble, information indicating a difference in frame timing between MeNB and HeNB (100).

8 Claims, 6 Drawing Sheets

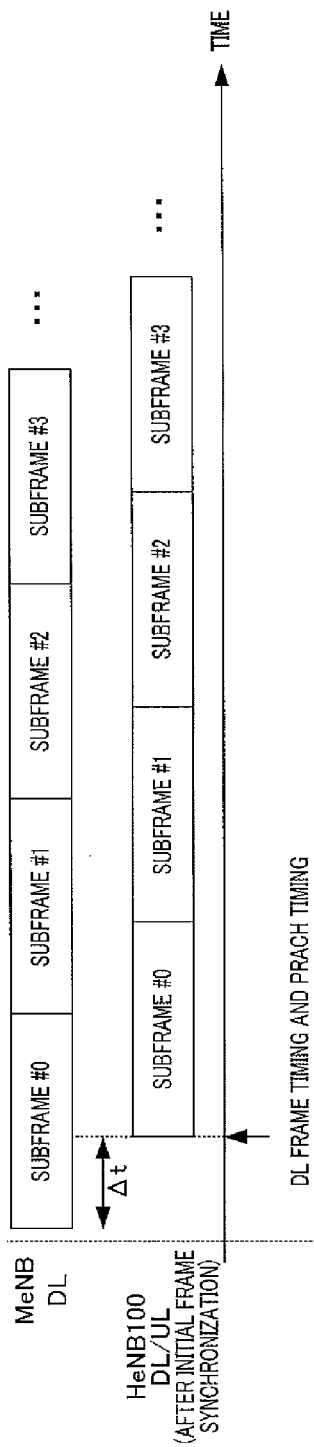
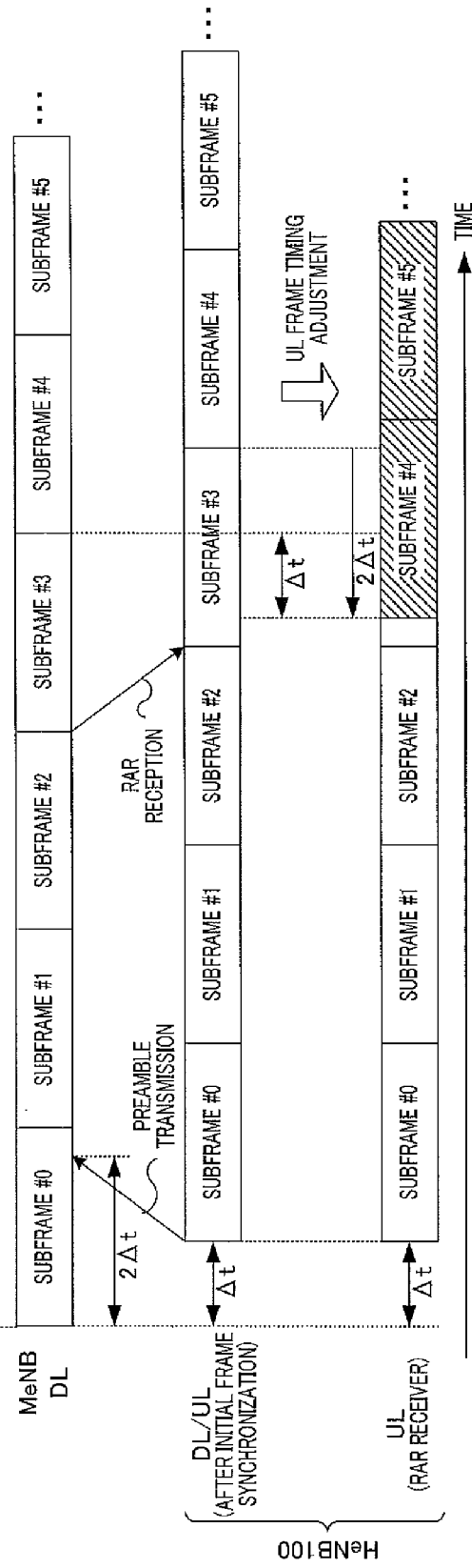
FIG.3A
FIG.3B

COMPACT BASE STATION APPARATUS AND FRAME TIMING DIFFERENCE INFORMATION ACQUIRING METHOD

TECHNICAL FIELD

The present invention relates to a micro base station apparatus and a frame timing difference information acquiring method.

BACKGROUND ART

Recently, a micro base station apparatus referred to as a femto cell (home base station: Home eNB, hereinafter, referred to as HeNB), which forms a small cell having a smaller communication area than that of a conventional cell has been developed for compensation of a dead zone in mobile phone networks.

Conventional large base station apparatuses to form cells having a large communication area (Macro base station: Macro eNB, hereinafter, referred to as an MeNB) determine the frame timing based on highly accurate time information acquired by, for example, GPS (Global Positioning System). Thus, highly accurate frame timing synchronization can be established between MeNBs. In contrast to this, considering costs and that HeNBs are mainly placed in buildings, it is difficult to provide HeNBs with GPS etc., and therefore the frame timings between an HeNB and MeNBs located around the HeNB are not synchronized with accuracy.

In view of the amount of calculations, it is desirable that the frame timings between an HeNB and an MeNB be synchronized with high accuracy so that the HeNB suppresses (cancels) interference from the MeNB. However, as described above, a large amount of calculations are required for suppressing interference from an MeNB when an HeNB cannot synchronize frame timing between the HeNB and an MeNB, and therefore apparatus costs rise, sharply.

Meanwhile, as a conventional technique for synchronizing the frame timings between the HeNB and the MeNB, the following technique is cited as an example. Specifically, Non-Patent Literature 1 proposes a technique in which an HeNB searches for a PBCH (Physical Broadcast Channel) and a SCH (Synchronization Channel) from an MeNB and thereby determines the frame timing of the HeNB. In the above conventional technique, the HeNB synchronizes the frame timing between the HeNB and the MeNB by searching for a PBCH and a SCH from the MeNB and determining the frame timing of the HeNB.

CITATION LIST

Non-Patent Literature

NPL 1
R4-093091, "Reducing HeNB interference to Macro eNB control channels" (Motorola)

SUMMARY OF INVENTION

Technical Problem

However, the above conventional technique does not take into account a propagation delay caused by the distance between an HeNB and an MeNB, so that the frame timings may not be synchronized accurately between an HeNB and MeNB.

If frame timing synchronization between the HeNB and the MeNB is not established, synchronization cannot be established between the MeNB and a communication terminal apparatus connected with the HeNB (hereinafter, referred to as an HUE). Accordingly, signals from the HUE may interfere with the MeNB over a plurality of subframes in uplink. Furthermore, synchronization is not established between the HeNB and a communication terminal apparatus which is from among communication terminal apparatuses connected with the MeNB (hereinafter, each referred to as an MUE) and is located in the vicinity of the HeNB (that is to say, an MUE having a small propagation delay between the HeNB). Therefore, the HeNB cannot suppress interference due to signals from the MUE located in the vicinity of the HeNB. That is to say, the HeNB may receive interference due to signals from the MUE over a plurality of subframes in uplink.

In view of the above, if the frame timings are not accurately synchronized between an HeNB and an MeNB, there arises a problem that interference occurs in uplink.

It is an object of the present invention to provide a micro base station apparatus and a method for acquiring frame timing difference information that can accurately synchronize frame timing between an HeNB and an MeNB, and suppress interference in uplink.

Solution to Problem

A micro base station apparatus according to a first aspect of the present invention is a micro base station apparatus and employs a configuration including a detection section that detects a frame timing of the macro base station apparatus using a synchronization signal transmitted from the macro base station apparatus; a control section that sets a downlink frame timing in the micro base station apparatus based on the frame timing of the macro base station apparatus; a transmission section that transmits an initial connection request signal to the macro base station apparatus in accordance with the downlink frame timing; and an acquiring section that acquires information showing a frame timing difference between the macro base station apparatus and the micro base station apparatus from a response signal to the initial connection request signal.

A method for acquiring frame timing difference according to the second aspect of the present invention is a method for acquiring frame timing difference information in a micro base station apparatus forming a smaller cell than a cell formed by a macro base station apparatus and employs a configuration to include the steps of detecting a frame timing of the macro base station apparatus using a synchronization signal transmitted from the macro base station apparatus; setting a downlink frame timing in the micro base station apparatus based on the frame timing of the macro base station apparatus; transmitting an initial connection request signal to the macro base station apparatus in accordance with the downlink frame timing; and acquiring information showing a frame timing difference between the macro base station apparatus and the micro base station apparatus from a response signal to the initial connection request signal.

Advantageous Effects of Invention

According to the present invention, it is possible to accurately synchronize frame timing between an HeNB and an MeNB and suppress interference in uplink.

BRIEF DESCRIPTION OF DRAWINGS

FIG. 3 illustrates a process for setting frame timing according to Embodiment 1 of the present invention;

DESCRIPTION OF EMBODIMENTS

Embodiments according to the present invention will be described below in detail with reference to the drawings. In the following explanation, an LTE (Long Term Evolution) which is one of the next-generation communication schemes will be described as an example. In the following explanation, an operation mode in an HeNB includes a surrounding search mode for searching for an MeNB located in a surrounding region and a main mode for transmitting uplink signals and downlink signals.

(Embodiment 1)

Figure 1:
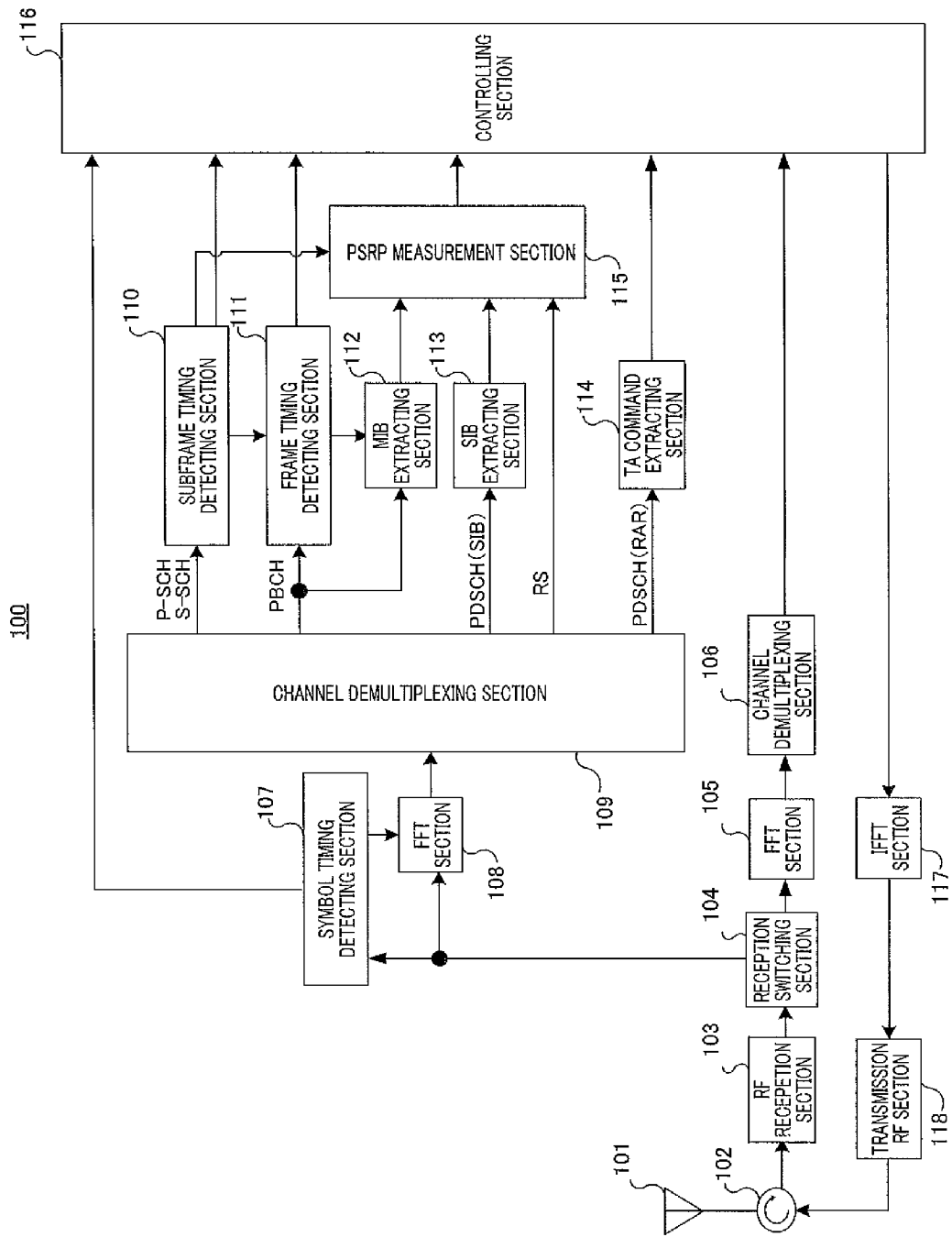
FIG. 1 is a block diagram showing a configuration of an HeNB according to Embodiment 1 of the present invention.

FIG. 1 is a block diagram showing a configuration of an HeNB according to the present embodiment. In HeNB 100 shown in FIG. 1, RF reception section 103 receives signals from an MeNB or UEs (HUEs and MUEs) through antenna 101 and duplexer 102.

Reception switching section 104 switches the reception mode to outputting received signals (downlink signals from MeNB) to symbol timing detecting section 107 and FFT section 108 in a surrounding search mode, and to outputting uplink received signals from HUEs to FFT section 105 in a main mode, FFT section 105 performs a discrete Fourier transformation on the received signals.

Channel demultiplexing section 106 demultiplexes signals after the discrete Fourier transformation per channel.

Symbol timing detecting section 107 detects symbol timing through CP (Cyclic Prefix) correlation calculation in downlink of an MeNB using signals input from reception switching section 104.

FFT (Fast Fourier Transform) section 108 performs a discrete Fourier transformation on received signals input from reception switching section 104, in accordance with the symbol timing detected in symbol timing detecting section 107.

Channel demultiplexing section 109 demultiplexes signals subjected to a discrete Fourier transformation per channel. For example, channel demultiplexing section 109 demultiplexes signals subjected to a discrete Fourier transformation per channel, and acquires, for example, P-SCH (Primary Synchronization Channel), S-SCH (Secondary Synchronization Channel), PBCH (Physical Broadcast Channel), PDSCH (Physical Downlink Shared Channel), and reference signals (Reference Signal: RS). Channel demultiplexing section 109 outputs the demultiplexed signals to subframe timing detecting section 110, frame timing detecting section 111, MIB extracting section 112, SIB extracting section 113, TA command extracting section 114, and RSRP measurement section 115.

Subframe timing detecting section 110 detects a subframe timing through a P-SCH correlation calculation and S-SCH correlation calculation when symbol timing detection succeeds in symbol timing detecting section 107. Also, subframe timing detecting section 110 detects a cell ID of an MeNB from an S-SCH cell ID group number and P-SCH ID number.

Frame timing detecting section 111 detects frame timing by PBCH detection when subframe timing detection succeeds in subframe timing detecting section 110. Symbol timing detecting section 107, subframe timing detecting section 110, and frame timing detecting section 111 detect the frame timing of an MeNB using downlink signals from the MeNB (for example, P-SCH, S-SCH, and PBCH).

MIB (Master Information Block) extracting section 112 extracts an MIB from PBCH based on various timing information acquired by processes in symbol timing detecting section 107, subframe timing detecting section 110 and frame timing detecting section 111, and the cell ID acquired by a process in subframe timing detecting section 110. The MIB is superimposed on PBCH and arranged in the first slot of the top subframe of each frame.

SIB (System Information Block) extracting section 113 extracts a SIB from PDSCH. The SIB is transmitted thorough PDSCH and transmission timing of the SIB is designated by an MIB. By this means, HeNB 100 collects base station information of an MeNB contained in an SIB. The base station information of the MeNB contains, for example, a channel bandwidth, a PRACH-config and a CP length.

TA command (Timing Advanced command) extracting section 114 extracts a TA command from a RAR (Random Access Response) superimposed on PDSCH. An RAR is a response signal to a Random Access Preamble (an initial connection request signal, hereinafter referred to as a preamble) to be described later. A TA command also contains information showing a frame timing difference between the MeNB and HeNB 100. That is to say, TA command extracting section 114 acquires information indicating the frame timing difference between the MeNB and HeNB 100 from a response signal to a preamble.

RSRP (Reference Signal Received Power) measurement section 115 generates a replica (RS replica) of downlink reference signals (RS) of MeNB based on base station information from the MeNB and measures RSRP from the RS replica and actually received reference signals (reception RS) input from channel demultiplexing section 109.

Control section 116 detects the presence of an interfering MeNB when symbol timing detecting section 107, subframe timing detecting section 110, and frame timing detecting section 111 succeed in all processes (when the frame timing of the MeNB is detected) in a surrounding search mode. Control section 116 then acquires the cell ID acquired in subframe timing detecting section 110 as a cell ID of the interfering MeNB. Control section 116 sets the frame timing detected in frame timing detecting section 111 as a downlink frame timing in HeNB 100.

Control section 116 also controls preamble transmission in accordance with base station information of an MeNB contained in the SIB acquired in SIB extracting section 113 (for example, a channel bandwidth, a PRACH-config, and a CP length) and the set frame timing. By this means, transmission RF section 118 transmits a preamble to an MeNB in accordance with the downlink frame timing set in control section 116. After transmission of the preamble, the control section 116 acquires a TA command contained in a RAR which is a response signal to the preamble, from TA command extracting section 114.

Control section 116 sets an uplink frame timing using a downlink frame timing, and a frame timing difference between an MeNB and HeNB 100 shown in a TA command. Specifically, control section 116 sets a frame timing acquired by shifting a downlink frame timing by the frame timing difference between the MeNB and HeNB 100 as an uplink frame timing in HeNB 100. Control section 116 then controls signal transmission and reception in accordance with the set downlink frame timing and an adjusted uplink frame timing in a main mode.

Control section 116 recognizes that HeNB 100 forms an isolated cell when any of the processes in symbol timing detecting section 107, subframe timing detecting section 110, and frame timing detecting section 111 fails (a case where frame timing of an MeNB is not detected) in a surrounding search mode. In this case, control section 116 sets a frame timing in uplink and downlink of HeNB 100 independently of an MeNB. Control section 116 controls transmission of uplink signals and downlink signals in accordance with the set frame timing in a main mode.

IFFT (Inverse Fast Fourier Transform) section 117 performs a discrete inverse Fourier transformation on signals input from control section 116 (uplink signals, downlink signals or a preamble) and transmission RF section 118 transmits the signals through duplexer 102 and antenna 101.

Next, a surrounding search mode in HeNB 100 (FIG. 1) according to the present embodiment will be described using FIG. 2 and FIG. 3.

HeNB 100 shown in FIG. 1 searches for P-SCH, S-SCH, and PBCH of an MeNB, performs an initial frame synchronization, and acquires a cell ID of the MeNB (step 101 (hereinafter, referred to as ST) shown in FIG. 2). Specifically, HeNB 100 enters the surrounding search mode and synchronizes with downlink of an MeNB located at a surrounding region immediately after power-on. To put it more specifically, HeNB 100 establishes synchronization through following three step (a) to (c).

(a) Symbol timing detecting section 107 detects symbol timing through CP correlation calculation in downlink of an MeNB using signals input from reception switching section 104.

(b) Subframe timing detecting section 110 detects a subframe timing through a P-SCH correlation calculation and S-SCH correlation calculation when the symbol timing detection succeeds.

(c) Frame timing detecting section 111 detects frame timing through PBCH detection when subframe timing detection succeeds.

Here, when all the processes in the above (a) to (c) succeed, that is to say, when P-SCH, S-SCH, and PBCH are detected, a success of the detection is notified to control section 116. Control section 116 receives the notification, determines a successful initial frame synchronization and sets frame the timing of the MeNB detected through the initial frame synchronization as a downlink frame timing (hereinafter, referred to as a DL frame timing) in HeNB 100 (ST102). Control section 116 also sets the DL frame timing in HeNB 100 to PRACH timing which is preamble transmission timing.

Figure 2:
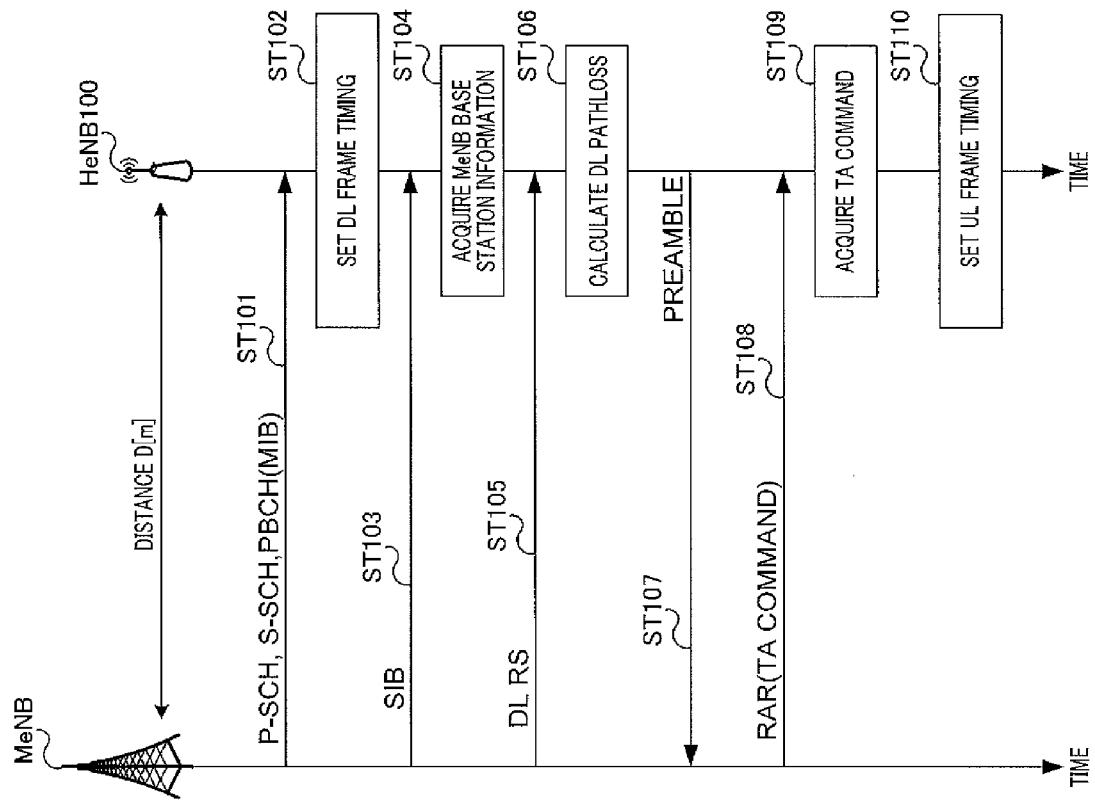
FIG. 2 is a sequence diagram of a surrounding search mode according to Embodiment 1 of the present invention.

Here, as shown in FIG. 2, a distance between an MeNB and HeNB 100 is assumed to be D[m]. In this case, there is propagation delay time $\Delta t(=D/c)$[sec] (c is velocity of light $(3\times10^8$[m/s])) in between an MeNB frame timing and an HeNB 100 frame timing after initial frame synchronization as shown in FIG. 3A. An MeNB determines the frame timing using, for example, GPS as described above.

Control section 116 also detects the presence of interfering MeNB and acquires a cell ID of the interfering MeNB from subframe timing detecting section 110. Then, MIB extracting section 112 extracts an MIB from PBCH based on the various timing information and the cell ID detected in the process (a) to (c).

SIB extracting section 113 also extracts a SIB from PDSCH based on transmission timing designated by an MIB (ST103). In view of the above, HeNB 100 acquires base station information of MeNB contained in the SIB (ST104).

Next, RSRP measurement section 115 generates a replica (RS replica) of downlink reference signals (DL RS) of an MeNB based on base station information of the MeNB acquired in ST104 and measures an RSRP from the RS replica and actually received reference signals (ST105), The RSRP is notified to control section 116, Control section 116 receives the notification and acquires a pathloss (a DL pathloss) between an MeNB and HeNB 100 (ST106).

Next, control section 116 controls preamble transmission using the PRACH timing set in ST102 (that is to say, the DL frame timing in HeNB 100) (ST107). By this means, HeNB 100 transmits a preamble to the MeNB in subframe 0 which is PRACH timing, shown in FIG. 3B, for example.

At this time, An MeNB receives a preamble from HeNB 100 $\Delta t$[sec] after HeNB 100 transmits the preamble as shown in FIG. 3B. That is to say, there is a $2\Delta t$ frame timing difference between the MeNB and HeNB 100 upon reception of a preamble at the MeNB (frame timing of HeNB 100 is delayed for $2\Delta t$) as shown in FIG. 3B. Then, the MeNB transmits an RAR containing a TA command to instruct correction of the frame timing difference ($2\Delta t$) between the MeNB and HeNB 100, to the HeNB 100 in, for example, subframe 3 shown in FIG. 3B (ST108). TA command extracting section 114 of HeNB 100 acquires the TA command from the RAR received in ST108 (a frame timing difference ($2\Delta t$) between the MeNB and HeNB 100) (ST109).

Control section 116 of HeNB 100 then sets an UL frame timing in subframe 4 so that the UL frame timing can start earlier by the frame timing difference ($2\Delta t$) between the MeNB and HeNB 100, using the TA command acquired in subframe 3 shown in FIG. 3B (ST110). At this time, no DL frame timing is changed, Accordingly, for example, the UL frame timing of HeNB 100 is set to start earlier than the frame timing of the MeNB by $\Delta t$[sec] as shown in FIG. 3B. When HeNB 100 transmits signals in subframe 4 shown in FIG. 3B, the MeNB receives the signals after $\Delta t$[sec], that is to say, in subframe 4 in the MeNB. Accordingly, the frame timing of the MeNB matches (synchronizes with) the frame timing of HeNB 100. Then, control section 116 keeps the set frame timing information of uplink and downlink, and ends the surrounding search mode.

HeNB 100 sets a DL frame timing with reference to DL frame timing of an MeNB in this way (ST102). On the other hand, HeNB 100 sets an UL frame timing through the same process as a process upon start of a UE (an MUE or an HUE) (an RACH process) as shown in FIG. 2 (ST110). That is to say, HeNB 100 establishes synchronization of the UL frame timing between an MeNB and HeNB 100 by acting as if HeNB 100 is an MUE for the MeNB in a surrounding search mode.

In view of the above, UL frame timing synchronization between an MeNB and HeNB 100 enables synchronization between HUEs and the MeNB, thereby making it possible to suppress interference with the MeNB due to signals from the HUEs in the uplink. Furthermore, since synchronization can be established between MUEs located in the vicinity of an HeNB and the HeNB, HeNB 100 can suppress interference due to signals from MUEs in the uplink by means of, for example, an interference removing (interference canceller) process (not shown).

On the other hand, HeNB 100 recognizes that HeNB 100 forms an isolated cell and sets a DL frame timing and an UL frame timing independently of an MeNB (that is to say, autonomously) upon a failure in any of the above processes (a) to (c) (in a case where frame timing of MeNB is not detected). In this case, although frame timing synchronization is not established between an MeNB and HeNB 100, HeNB 100 is an isolated cell, and therefore can communicate with the MeNB with no interference.

According to the present embodiment, it is possible to accurately synchronize frame timing between an HeNB and an MeNB and suppress interference in uplink.

(Embodiment 2)

Figure 4:
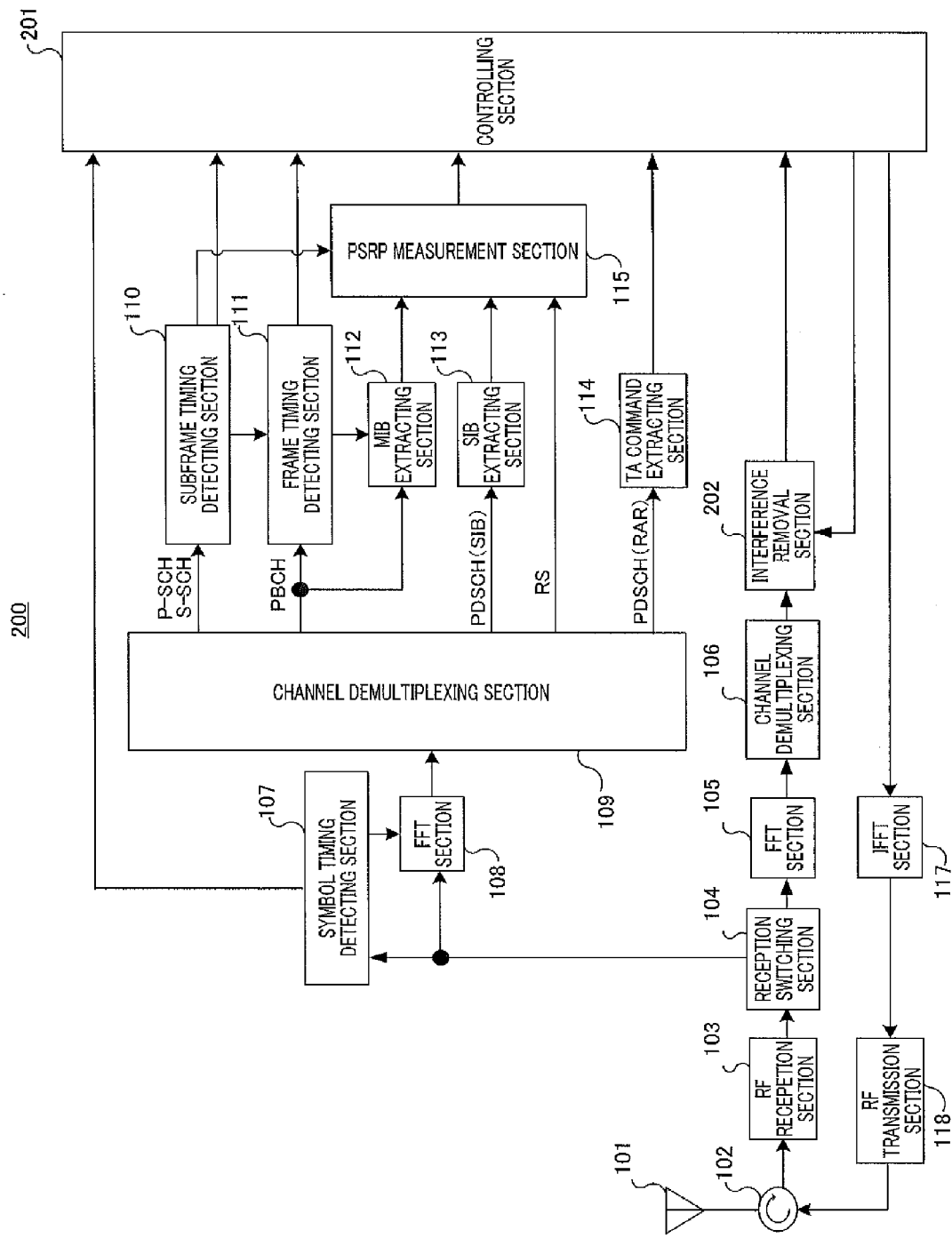
FIG. 4 is a block diagram showing a configuration of an HeNB according to Embodiment 2 of the present invention.

FIG. 4 is a block diagram showing a configuration of an HeNB according to the present embodiment. Here, in FIG. 4, the same components as in FIG. 1 will be assigned the same reference numerals, and overlapping descriptions will be omitted.

In HeNB 200 shown in FIG. 4, control section 201 detects the presence of an interfering MeNB when all processes succeed in symbol timing detecting section 107, subframe timing detecting section 110, and frame timing detecting section 111 (a case where frame timing of an MeNB is detected) in a surrounding search mode as with control section 116 (FIG. 1) in the present Embodiment 1. Control section 201 then acquires a cell ID acquired in subframe timing detecting section 110 as a cell ID of the interfering MeNB. Control section 201 sets the frame timing detected in frame timing detecting section 111 as uplink frame timing and downlink frame timing in HeNB 100.

Control section 201 also controls preamble transmission in accordance with base station information of the MeNB contained in a SIB acquired in SIB extracting section 113 and the set frame timing. After transmission of a preamble, control section 201 acquires a TA command contained in an RAR which is a response signal to the preamble, from TA command extracting section 114. At this time, control section 201 stores a frame timing difference between an MeNB and HeNB 200 shown in TA command as propagation delay time information showing propagation delay time between the MeNB and the HeNB. Then, control section 201 outputs the propagation delay time information to interference removal section 202.

Control section 201 recognizes that HeNB 200 forms an isolated cell, when any of the processes of symbol timing detecting section 107, subframe timing detecting section 110, and frame timing detecting section 111 fails (a case where frame timing of MeNB is not detected) in a surrounding search mode, similarly to the control section 116 (FIG. 1) according to Embodiment 1. Control section 201 then sets the frame timings in uplink and downlink of HeNB 200 independently of MeNB. Control section 201 controls transmission of uplink signals and downlink signals in accordance with the set frame timing in a main mode.

Interference removal section 202 suppresses interference signals from received signals input from channel demultiplexing section 106 and acquires a desired signal. An Interference removal scheme includes, for example, a JMAP (Joint Maximum A Posterior) scheme. At this time, interference removal section 202 removes interference components from received signals using propagation delay time information input from control section 201 (that is to say, a frame timing difference between an MeNB and HeNB 200. Interference removal section 202 outputs received signals in which interference components are removed to control section 201.

Next, a surrounding search mode in HeNB 200 (FIG. 1) according to the present embodiment will be described using FIG. 5 and FIG. 6. Here, in FIG. 5, the same process as in Embodiment 1 (FIG. 2) will be assigned the same reference numerals, and overlapping descriptions will be omitted.

Figure 5:
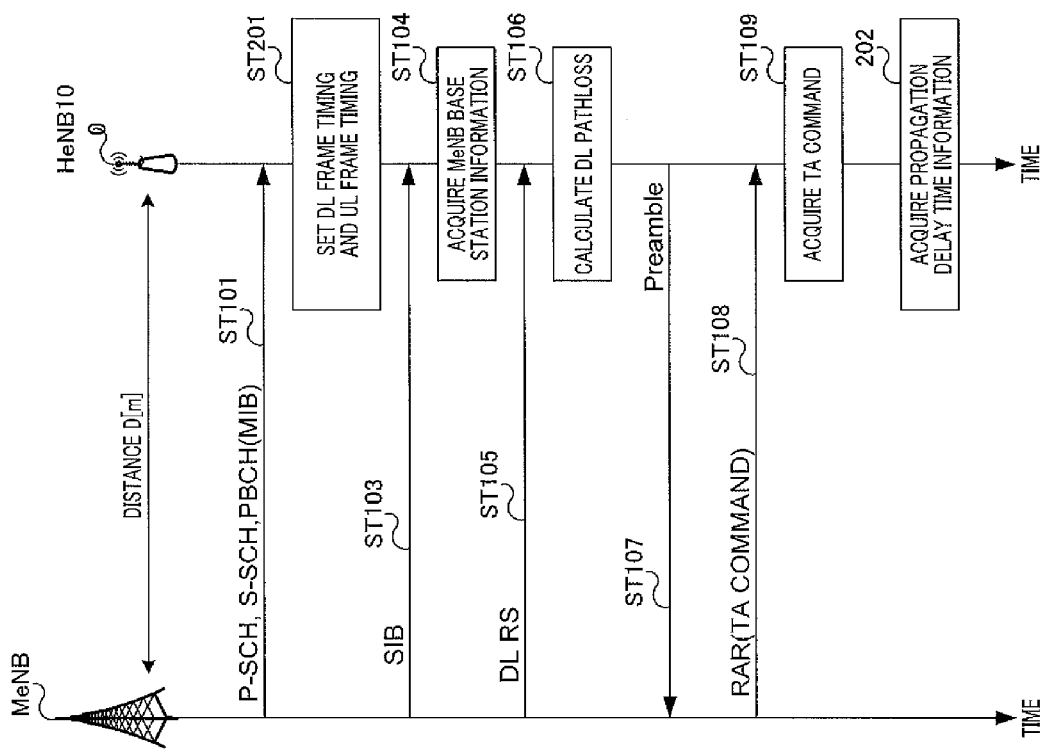
FIG. 5 is a sequence diagram of a surrounding search mode according to Embodiment 2 of the present invention.

That is to say, control section 201 of HeNB 200 shown in FIG. 1 sets the frame timing of an MeNB detected through initial frame synchronization as with ST101 of Embodiment 1 to a DL frame timing and an UL frame timing in HeNB 200 as shown in FIG. 5 and FIG. 6 (ST201) immediately after power-on.

Control section 201 of HeNB 200 acquires a frame timing difference between an MeNB and HeNB 200 contained in a TA command acquired in ST109 as propagation delay time information showing propagation delay time between the MeNB and HeNB 200 (2Δt in FIG. 6B) (ST202), and ends a surrounding search mode.

Then, interference removal section 202 of HeNB 200 removes interference from received signals (performs an interference canceller process) in a main mode. At this time, interference removal section 202 suppresses interference components from received signals using the propagation delay time information acquired in control section 201 in ST202 shown in FIG. 5 and acquires desired signals.

Figure 6A:
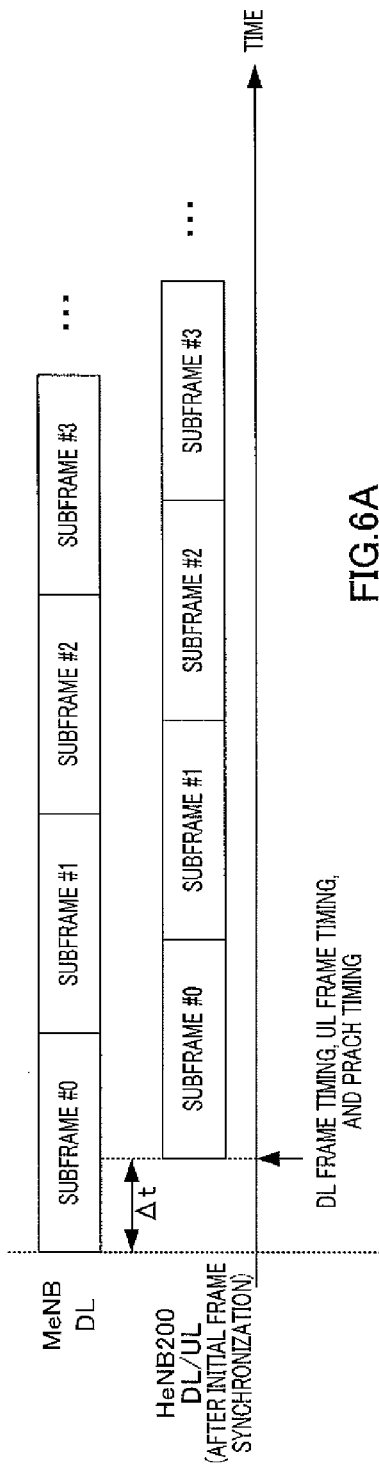
FIG. 6 is a drawing showing a process for setting frame timing according to Embodiment 2 of the present invention.
Figure 6B:
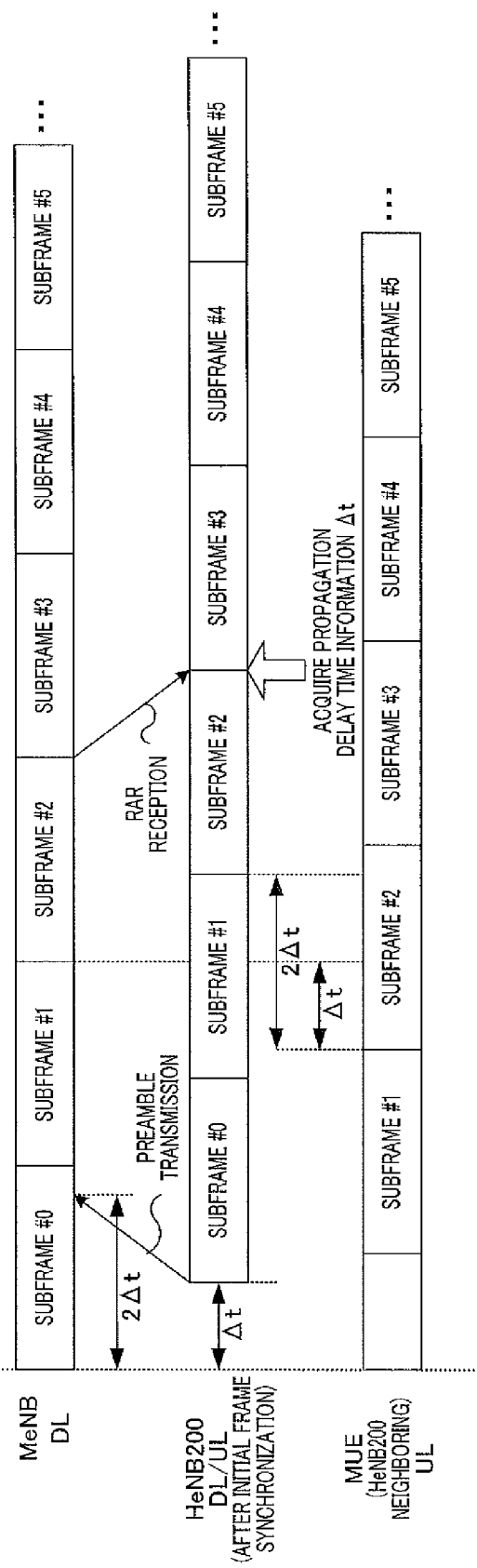

Here, a case will be described where HeNB 200 receives signals from MUEs located in the vicinity of HeNB 200 (UEs which may interfere with HeNB 200). Focusing on subframe 2 shown in FIG. 6B, since an UL frame timing of an MUE located in the vicinity of HeNB 200 synchronizes with a connection-destination MeNB, the UL frame timing of the MUE is set to start earlier than frame timing of the MeNB by Δt in consideration of propagation delay (Δt) between the MeNB and the MUE. By contrast with this, the DL/UL frame timings set in a surrounding search mode in HeNB 200 are set to start later than the frame timing of the MeNB by propagation delay time Δt between the MeNB and HeNB 200 as shown in FIG. 6A. Also, a propagation delay between HeNB 200 and an MUE located in the vicinity of HeNB 200 is small in comparison with the propagation delay between an MeNB and HeNB 200 (MUE) and can be ignored. Accordingly, there is a frame timing difference of propagation delay time (2Δt) between HeNB 200 and MeNB, between HeNB 200 and an MUE as shown in FIG. 6B.

Interference removal section 202 of HeNB 200 makes adjustment to delay frame timing of received signals containing signals from an MUE located in the vicinity of HeNB 200 (interference signals to HeNB 200), by propagation delay time (2Δt) and removes interference from the received signals after the frame timing adjustment to suppress interference. That is to say, interference removal section 202 adjusts frame timing of interference signals from an MUE and synchronizes the adjusted frame timing of the interference signals with frame timing of HeNB 200 in an interference removal process.

That is to say, although the frame timing of an MUE located in the vicinity of an HeNB and the frame timing of HeNB 200 are different each other actually, synchronization can be established between the MUE located in the vicinity of HeNB 200 (that is to say, an MeNB) and HeNB 200 through an interference removal process. HeNB 200 therefore can suppress interference due to signals from an MUE located in the vicinity of HeNB 200 in uplink.

HeNB 200 recognizes that HeNB 200 forms an isolated cell and sets a DL frame timing and an UL frame timing independently of an MeNB (that is to say, autonomously) when frame timing of MeNB is not detected in a surrounding search mode as with Embodiment 1. In this case, although frame timing synchronization is not established between an MeNB and HeNB 200, HeNB 200 is an isolated cell, so that it is possible to perform communication with no interference for the MeNB as with Embodiment 1.

As described above, according to the present embodiment, it is possible to suppress interference in uplink by taking account of frame timing difference between an HeNB and an MeNB during interference removal process as in Embodiment 1.

Furthermore, according to the present embodiment, an HeNB sets both uplink frame timing and downlink frame timing based on a result of initial frame synchronization with an MeNB upon a surrounding search. Thus, an HeNB can readily manage frame timing as compared to Embodiment 1 (that is to say, a case where an UL frame timing is adjusted based on a TA command).

Embodiments of the present invention have been described above.

The embodiments have been described by employing an LTE case as example, but the present invention is not limited to this, and can also be applied to all radio communication schemes which allow a mixture of an MeNB and an HeNB.

The disclosure of Japanese Patent Application No.2010-046634, filed on Mar. 3, 2010, including the specification, drawings and abstract, is incorporated herein by reference in its entirety.

INDUSTRIAL APPLICABILITY

The present invention is suitable for a mobile communication system including an MeNB, an MUE, an HeNB, and an HUE.

REFERENCE SIGNS LIST 100, 200 HeNB
101 Antenna
102 Duplexer
103 RF reception section
104 Reception switching section
105, 108 FFT section
106, 109 Channel demultiplexing section
107 Symbol timing detecting section
110 Subframe timing detecting section
111 Frame timing detecting section
112 MIB extracting section
113 SIB extracting section
114 TA command extracting section
115 RSRP measurement section
116, 201 control section
117 IFFT section
118 RF transmission section
202 Interference removal section

The invention claimed is:

1. A micro base station apparatus forming a smaller cell than a cell formed by a macro base station apparatus, the micro base station comprising:
  a reception section configured to receive a synchronization signal transmitted from the macro base station apparatus;
  a detection section configured to detect a frame timing of the macro base station apparatus, using the received synchronization signal;
  a transmission section configured to transmit a pseudo initial connection request signal to pretend to be a terminal apparatus requesting a connection with the macro base station;
  an acquiring section configured to acquire a response to the pseudo initial connection request signal; and
  a control section configured to set a downlink frame timing of the micro base station apparatus based on the frame timing of the macro base station apparatus and the response to the pseudo initial connection request signal.

2. The micro base station apparatus according to claim 1, wherein the transmission section is further configured to transmit the pseudo initial connection request signal in accordance with the frame timing of the macro base station,
  the response to the pseudo initial connection request signal includes information showing a frame timing difference calculated based on a timing when the pseudo initial connection request signal is transmitted from the micro base station apparatus and a timing when the pseudo initial connection request signal is received by the macro base station apparatus, and
  the control section is further configured to set the downlink frame timing of the micro base station apparatus based on the frame timing of the macro base station apparatus and the frame timing difference included in the response to the pseudo initial connection request signal.

3. The micro base station apparatus according to claim 2, wherein the control section is further configured to set an uplink frame timing of the micro base station apparatus, using the frame timing difference and the frame timing of the macro base station apparatus.

4. The micro base station apparatus according to claim 3, wherein the control section is configured to set the uplink frame timing and the downlink frame timing independently from the frame timing of the macro base station apparatus when no frame timing is detected by the detection section.

5. The micro base station apparatus according to claim 2 further comprising a removal section configured to remove interference components from a received signal, using the frame timing difference, wherein the control section is configured to set an uplink frame timing and the downlink frame timing in the micro base station apparatus based on the frame timing of the macro base station apparatus.

6. The micro base station apparatus according to claim 5, wherein the control section is configured to set the uplink frame timing and the downlink frame timing independently of the macro base station apparatus when no frame timing is detected by the detection section.

7. A method for acquiring frame timing difference information in a micro base station apparatus forming a smaller cell than a cell formed by a macro base station apparatus, the method comprising:
  a reception step of receiving a synchronization signal transmitted from the macro base station apparatus;
  a detection step of detecting a frame timing of the macro base station apparatus, using the received synchronization signal;
  a transmitting step of transmitting a pseudo initial connection request signal to pretend to be a terminal apparatus requesting a connection with the macro base station;
  an acquiring step of acquiring a response to the pseudo initial connection request signal; and
  a control step of setting a downlink frame timing of the micro base station apparatus based on the frame timing of the macro base station apparatus and the response to the pseudo initial connection request.

8. The micro base station apparatus according to claim 1, wherein, the micro base station does not have a function to establish a connection with the macro base station based on the response to the pseudo initial connection request signal.

* * * * *